R. J. HAMILTON.
MACHINE FOR MOLDING CEMENT BLOCKS.
APPLICATION FILED NOV. 17, 1909.
975,231.
Patented Nov. 8, 1910.
3 SHEETS—SHEET 1.
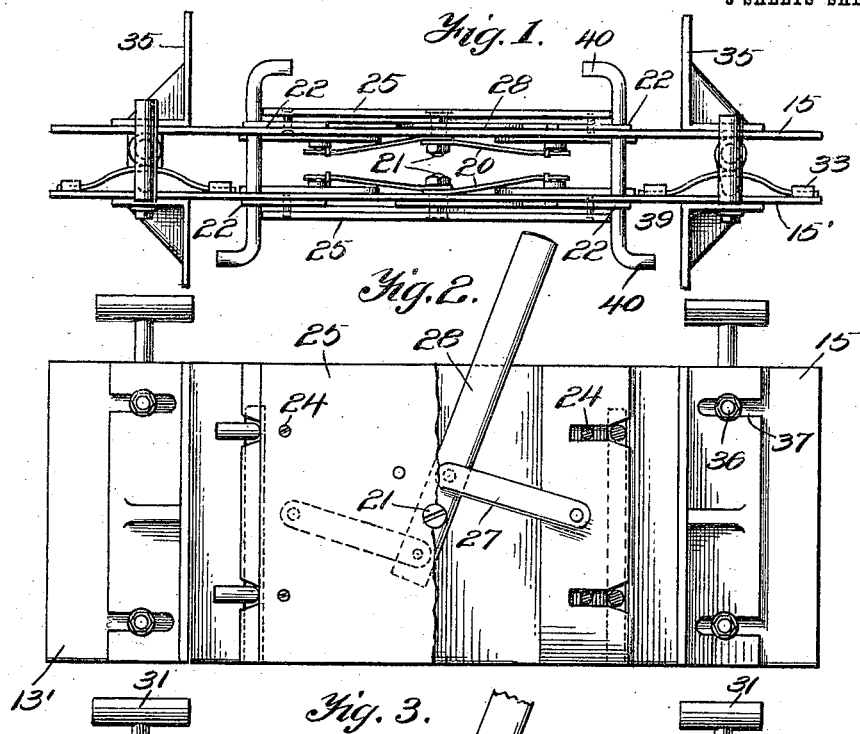
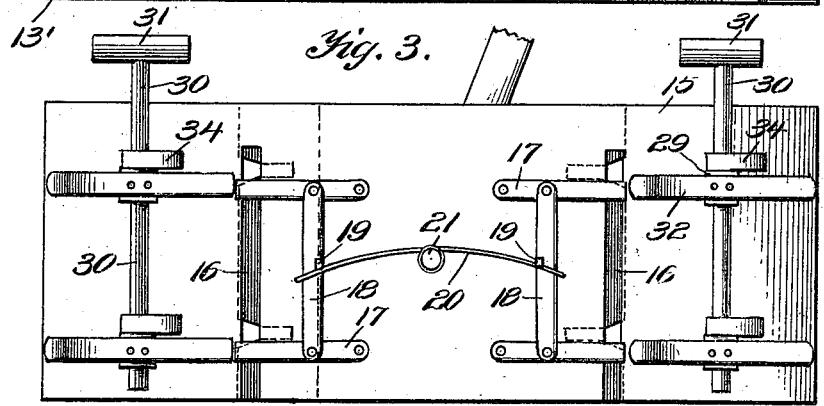
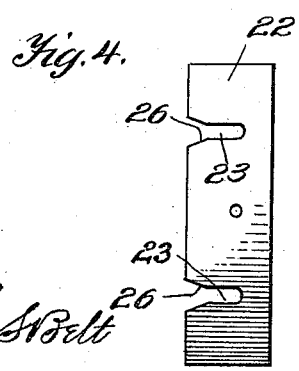
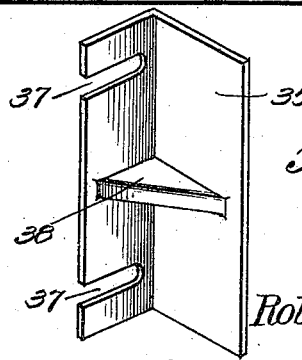
Witnesses
Fenton S. Belt
Wm. Bagger
Inventor
Robert J. Hamilton
By Victor J. Evans
Attorney R. J. HAMILTON.
MACHINE FOR MOLDING CEMENT BLOCKS.
APPLICATION FILED NOV. 17, 1909.
975,231.
Patented Nov. 8, 1910.
3 SHEETS—SHEET 2.
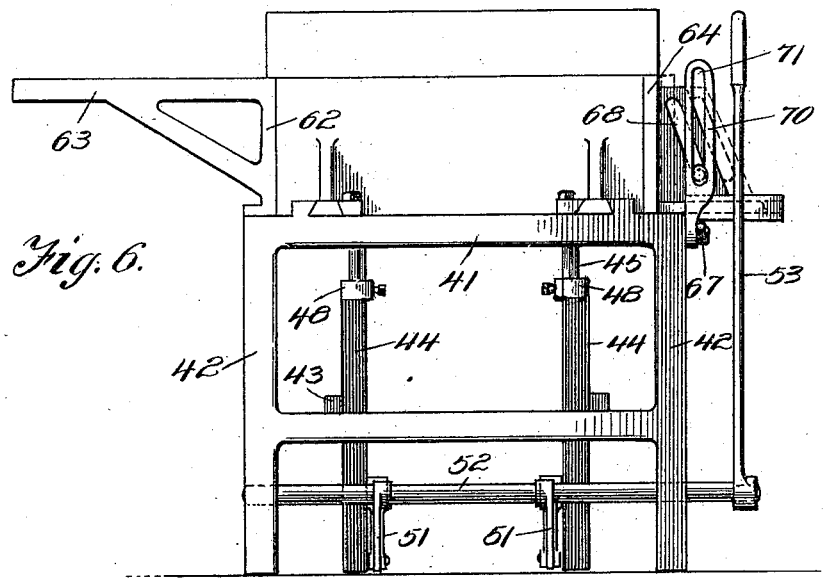
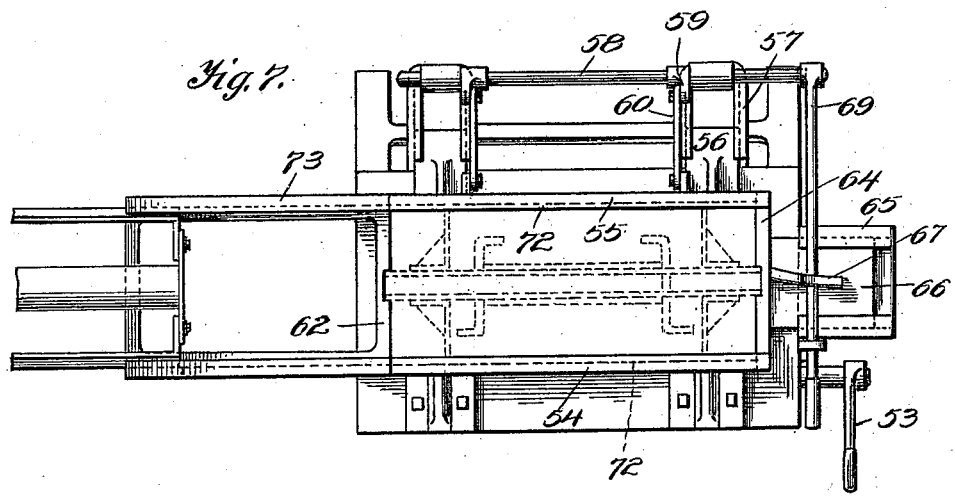
Witnesses
Inventor
Robert J. Hamilton
By Victor J. Evans
Attorney R. J. HAMILTON.
MACHINE FOR MOLDING CEMENT BLOCKS.
APPLICATION FILED NOV. 17, 1909.
975,231.
Patented Nov. 8, 1910.
3 SHEETS—SHEET 3.
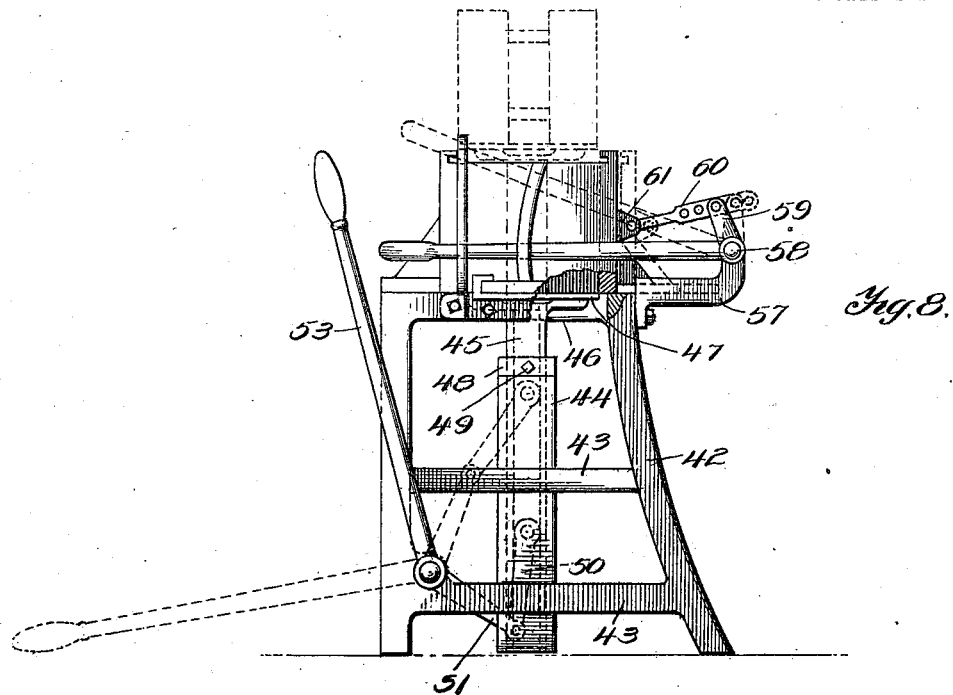
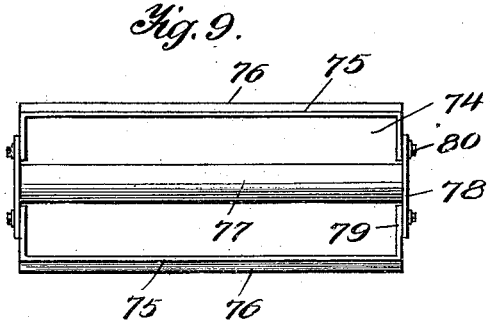
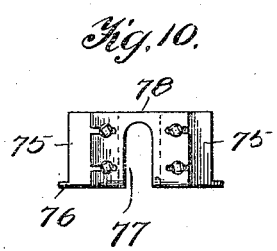
Witnesses
Fenton S. Belt.
Wm. Bagger
Inventor
Robert J. Hamilton
By Victor J. Evans
Attorney

UNITED STATES PATENT OFFICE.

ROBERT J. HAMILTON, OF WICHITA, KANSAS.

MACHINE FOR MOLDING CEMENT BLOCKS.

975,231.  Specification of Letters Patent.  Patented Nov. 8, 1910.

Application filed November 17, 1909. Serial No. 528,508.

*To all whom it may concern:*

Be it known that I, ROBERT J. HAMILTON, a citizen of the United States, residing at Wichita, in the county of Sedgwick and State of Kansas, have invented new and useful Improvements in Machines for Molding Cement Blocks, of which the following is a specification.

This invention relates to machines for molding building blocks of plastic material such as cement or a composition containing cement and which has particular reference to machines for molding that class of blocks which are composed of two separate blocks or side members which are spaced apart and connected together by means of tie rods embedded in said blocks, thus forming a building block composed of two side members adapted for the construction of a wall having an interior air space extending entirely therethrough for the purpose of affording interior ventilation and avoiding moisture.

One of the principal objects of the invention is to construct a core adapted to form the intermediate space in the building block and adapted to support the tie rods during the process of forming or molding the block.

A further object of the invention is to so construct the said core that it may be collapsed so as to facilitate the removal of the same from the block after molding.

A further object of the invention is to construct the core with tie rod supporting devices which may be withdrawn out of the path of the tie rods when the core is removed from the block after molding.

A further object of the invention is to provide the collapsible core with adjustable means for regulating the longitudinal dimensions of the blocks to be molded.

A further object of the invention is to provide a hopper adapted to be used in connection with the core for leveling or stripping off the top of the block after molding.

A still further object of the invention is to simplify and improve the construction and operation of the molding machine proper in connection with which the core and the hopper are used.

Still further objects of the invention are to simplify and improve the general construction and operation of a device of the character described.

With these and other ends in view which will readily appear as the nature of the invention is better understood the same consists in the improved construction and novel arrangement and combination of parts which will be hereinafter fully described and particularly pointed out in the claims.

In the accompanying drawings has been illustrated a simple and preferred form of the invention; it being however, understood that no limitation is necessarily made to the precise structural details therein exhibited, but that changes, alterations and modifications within the scope of the invention may be resorted to when desired.

In the drawings: Figure 1 is a top plan view of the collapsible core. Fig. 2 is a side elevation of the same, parts having been broken away for the purpose of exposing the subjacent construction. Fig. 3 is a longitudinal vertical sectional view of the core, collapsed. Fig. 4 is a detail view in side elevation of one of the tie rod supporting shutters. Fig. 5 is a perspective detail view of one of the angle plates used in connection with the core. Fig. 6 is a side elevation of the molding machine. Fig. 7 is a top plan view of the same. Fig. 8 is an end elevation of the same with parts broken away. Fig. 9 is a top plan view of the hopper. Fig. 10 is an end elevation of the same. Fig. 11 is a vertical transverse sectional view of the hopper showing the side walls of the same tilted.

Corresponding parts in the several figures are denoted by like characters of reference.

The collapsible core is composed of two plates or side members 15 and 15' each of which is provided with vertical slots 16 extending upwardly from the lower edge thereof for the admission of the tie rods. Upon the inner face of each of said plates pairs of levers 17 are pivotally mounted, said levers having their free ends projected over the slots 16, and said levers being connected in pairs by means of links 18, having lugs or studs 19 which are supported upon springs 20 which may be conveniently mounted upon pins 21 extending through the plates, said springs serving to support the levers 17 normally in an approximately horizontal position. Slidably mounted upon the outer face of each of the plates 15 and 15' are blades 22 which I term the tie rod supporting shutters; said shutters being provided with slots 23 engaging guide bolts 24 which latter also serve to secure in position the facing plates 25; the outer extremities of the slots 23 are made flaring as shown very clearly at 26 in Fig. 4 of the drawings for convenient engagement with the tie rods; the shutters 22 are adapted to be projected over the vertical slots 16 which are thereby covered and protected from admission of cement in a plastic state which would otherwise harden in the path of the tie rods and thereby interfere with the removal of the core after molding. The shutters 22 at opposite ends of each side plate are connected by links 27 with a lever 28 which may be fulcrumed upon the pin or bolt 21, said links being connected with the lever at opposite sides of its fulcrum so that by rocking the lever the shutters may be simultaneously projected over the slots 16 or withdrawn from registry with said slots.

One of the side plates 15 has been shown as being provided upon its inner face with pairs of lugs 29 disposed intermediate the slots 16 and the ends of the plates, said lugs affording bearings for vertically disposed rock shafts 30 provided at their upper ends with handles 31 whereby they may be manipulated. Firmly secured upon the faces of the lugs 29 are flat springs 32 the ends of which are slidably mounted in keepers 33 upon the inner face of the opposed side plate 15′, said springs serving to connect the side plates 15 and 15′ together and to move said side plates in the direction of each other for the purpose of collapsing the core. Each of the rock shafts is provided with cams 34 which, when the core is collapsed, are adapted to lie between the plates 15 and 15′ in the planes of the lugs 29; by a quarter revolution of the shafts 30 the free ends of the cams will be caused to engage the plate 15′, thus moving the latter apart from its mate and properly spacing the said plates apart to expand the core as will be seen in Fig. 1.

Angle plates 35 which may be used to constitute the ends of the mold are slidably and adjustably connected with the plates 15 and 15′ adjacent to the ends of said plates by fastening means such as bolts 36 engaging slots 37 in the walls of the angle plates; said plates have been shown as provided with reinforcing braces 38.

The tie rods 39 are terminally provided with heads 40 which may be formed by suitably bending the ends of said rods substantially at right angles to the bodies thereof; it will be understood however, that the tie rods may be provided with heads of any suitable and appropriate form and construction which, being embedded in the side members of the block, will serve to tie and connect said side members firmly together.

The bed 41 of the molding machine is suitably supported upon legs or uprights 42 forming part of a suitable frame structure including cross bars or braces 43 upon which vertically disposed guide ways 44 are suitably mounted. Mounted for vertical movement in the guideways 44 are slides 45 provided at their upper ends with cross heads 46 to support the pallet 47. The downward movement of said slides is limited by collars 48 secured thereupon by set screws 49. The slides 45 are connected by means of links 50 with cranks or arms 51 extending from a rock shaft 52 with one end of which a hand lever 53 is suitably connected for the purpose of moving the pallet carrying slides in an upward direction, to project the block from the mold.

The mold proper comprises side plates, one of which 54 may be adjustably but securely mounted upon the bed plate while the opposite side plate 55 is provided with guide lugs 56 slidably engaging the supporting brackets 57 which are suitably mounted upon the frame of the machine and which also serve to afford bearings for a rock shaft 58 having cranks 59 which are connected by means of links 60 with lugs 61 upon the outer face of the side plate 55 which latter is thus capable of sliding movement relatively to its mate 54 at the opposite side of the bed plate of the machine. The mold frame also comprises end plates one of which 62 is stationary, being firmly bolted upon the bed plate of the machine or otherwise secured, said stationary end plate being also formed with a laterally extending shelf or bracket 63 adjacent to its upper edge. The opposite end plate 64 is slidably supported upon a bracket 65 by means of an angle plate 66 extending from the said end plate adjacent to the lower edge thereof. A wall or web 67 which connects the plate 64 with the angle plate 66 serves to reinforce the parts, and said web is provided with an inclined slot 68 through which extends a hand lever 69 which is connected with the rock shaft 58 for the purpose of oscillating the latter, and it will be seen that when said lever is manipulated to oscillate the rock shaft for the purpose of moving the side plate 55 in a direction away from its mate 54, the lever 69 at the same time engages the inclined slot 68, thus moving the end plate 64 in an outward direction from the side plates of the mold. For the purpose of guiding the free end of the lever 69 in a vertical plane and to prevent it from being deflected from its course by the inclined slot 68, a bracket 70 is provided having a vertically disposed slot 71 through which the free end of the lever 69 is guided. Grooves 72 are formed adjacent to the upper edges of the sides of the mold, said grooves being also extended through flanges 73 formed upon the shaft or bracket 63 for the accommodation of a hopper 74 comprising side members 75 which are provided adjacent to their lower edges with groove engaging flanges 76. Said hopper also includes a centrally disposed longitudinal arch member 77 having terminal flanges 78 combining with flanges 79 upon the ends of the side members 75 to form a hopper frame of suitable dimensions; the side members 75 are tiltably and adjustably connected with the flanges 78 of the intermediate member by fastening members 80 engaging slots 81 in the flanges 78, said slots being sufficiently wide to permit the side members 75 to be slightly tilted in an outward direction when desired substantially as represented in Fig. 11 of the drawings.

The operation and advantages of this invention will be readily understood from the foregoing description taken in connection with the drawings hereto annexed by those skilled in the art to which it appertains.

It will be seen that while the mold frame proper is formed by the side walls 54—55 and the end walls 62—64, the longitudinal dimensions of said frame may be varied by the use of the angle plates 35 connected with the core when the latter is placed in the mold, it being obvious that said angle plates should be of such dimensions that their outer edges will abut upon the inner faces of the side plates of the mold frame when the core is expanded, as will appear in dotted lines in Fig. 7. Prior to the insertion of the core within the mold frame, the tie rods are adjusted by inserting said rods into the slots 16 that extend upwardly from the lower edges of the side plates of the core. The levers 17 will readily yield to the insertion of the tie rods, which, after inserting will be resiliently supported upon the free ends of said levers until the shutters 22 are projected over the slots 16 by manipulating the lever 28. When the shutters are thus projected, the tie rods will be guided into the flaring ends of the slots 23 where they will remain firmly supported. The core may now be adjusted in the mold frame where it rests upon the pallet which has previously been inserted, and the said core is initially extended as will be readily understood by turning the rock shafts 30 to the positions indicated in Fig. 1. The hopper may now be placed in position by sliding it lengthwise into engagement with the grooves 72, and plastic material may now be introduced to form the block; it will be particularly observed that there are no projections or obstructions to hinder the plastic material from being thoroughly tamped within the mold and around the projecting ends of the tie rods. When the mold has been filled, the hopper is removed by sliding it into the direction of the shelf or bracket 63 upon which surplus plastic material struck off by the hopper will thus be deposited, and after allowing a sufficient period to lapse for the plastic material to set, the block may be removed by first collapsing the side plates of the core, next manipulating the lever 28 to withdraw the shutters 22 from engagement with the tie rods, and then lifting the core bodily from the mold frame, the handles 31 affording means whereby the core may be very conveniently manipulated. The hand lever 69 is next manipulated to move the side and end plates 55 and 64 outwardly from the block, and the latter may then be projected in an upward direction by manipulating the lever 53 whereby the pallet carrying slides 45 are elevated until the pallet is raised to a point where it may be conveniently seized for the purpose of carrying it and the block reposing thereon to a suitable location where the block may dry and harden sufficiently to enable it to be safely handled.

It will be seen that by the means and mechanism herein described, building blocks of the particular character referred to may be manufactured at a rapid rate and in a very thorough and efficient manner.

The construction of the machine is simple and it may be conveniently and successfully operated without resorting to special skilled labor.

Having thus described the invention, what is claimed is—

1. A collapsible core including adjustably connected side plates having slots extending upwardly from their lower edges, pairs of levers pivoted exteriorly upon said side plates and projecting over the slots, and means for resiliently supporting said levers in an approximately horizontal position.

2. A collapsible core including adjustably connected side members having slots extending upwardly from their lower edges, pairs of levers pivoted upon the side members and projecting over the slots, links connecting said levers in pairs, and springs engaging the links to support the levers normally in an approximately horizontal position.

3. A collapsible core including adjustably connected side members having slots extending upwardly from their lower edges, notched shutters slidably engaging the side members, and means for projecting said shutters over the slots.

4. A collapsible core including adjustably connected side members having tie rod engaging slots extending upwardly from their lower edges, and resiliently supported tie rod supporting members pivotally connected with said side members.

5. A collapsible core including adjustably connected side members having tie rod engaging slots extending upwardly from their lower edges, resiliently supported tie rod supporting members pivotally connected with said side members, notched tie rod supporting shutters slidably connected with the side members, and means for manipulating the shutters.

6. A collapsible core including adjustably connected side members having tie rod receiving notches extending upwardly from their lower edges, notched tie rod supporting shutters slidably connected with the side members, levers pivoted upon the side members, and links connecting said levers with the shutters which may thereby be projected over the tie rod receiving slots and retracted.

7. A collapsible core comprising resiliently connected side members having tie rod receiving slots extending upwardly from their lower edges, means for expanding the side members, tie rod supporting levers pivoted in pairs upon the side members and projecting over the slots, links engaging said levers in pairs, supporting pins extending through the side members, springs supported upon said pins and engaging the links to maintain the pairs of levers normally in approximately horizontal position, notched shutters slidably supported upon the side members, levers mounted upon the supporting pins, and links connecting said levers with the slidable shutters.

8. A collapsible core including adjustably connected side members having tie rod receiving slots extending upwardly from their lower edges, resiliently supported tie rod supporting levers mounted upon the inner faces of the side members, and projecting over the slots, notched tie rod supporting shutters slidably supported upon the outer faces of the side members, means for actuating said shutters to project them over the tie rod receiving slots, and face plates mounted exteriorly of the side members to protect the operating mechanism.

9. A collapsible core comprising adjustably connected side members having tie rod receiving slots, tie rod supporting means mounted upon said plates, means including springs for projecting the tie rod supporting means over the slots in the path of the tie rods and resiliently holding the supporting means in projected position to yield to the tie rods when the core is withdrawn, and angle plates adjustably mounted upon the side members adjacent to the ends of the latter.

10. In a machine of the class described, a suitably supported bed plate, a mold frame supported thereon, and comprising a stationary side plate, a stationary end plate and relatively movable side and end plates, and a collapsible core having tie rod supporting means, and means for retracting the supporting means out of the path of the tie rods.

11. In a device of the class described, a suitably supported bed plate, a mold frame supported upon the bed plate and including an outwardly movable side plate, and an outwardly movable end plate, said movable plates being slidably supported, and said end plate being provided with a web having an inclined slot, a rock shaft having cranks, links connecting said cranks with the movable side plate, and a hand lever upon the rock shaft guided through the inclined slot in the web of the end plate.

12. In a device of the class described, a suitably supported bed plate, a mold frame supported upon the bed plate and including an outwardly movable side plate, and an outwardly movable end plate, said movable plates being slidably supported, and said end plate being provided with a web having an inclined slot, a rock shaft having cranks, links connecting said cranks with the movable side plate, a hand lever upon the rock shaft guided through the inclined slot in the web of the end plate, and a stationary bracket having a vertical slot through which said hand lever is also guided.

In testimony whereof I affix my signature in presence of two witnesses.

ROBERT J. HAMILTON.

Witnesses:
ENOCH F. KOONTZ,
ELGIA KOONTZ.